May 12, 1970 GILBERT Y. CHIN ET AL 3,511,639
MAGNETIC ALLOY MATERIAL
Filed Sept. 5, 1967 2 Sheets-Sheet 1

INVENTORS G. Y. CHIN
D. JAFFE
E. A. NESBITT
BY Edward M. Fink
ATTORNEY

May 12, 1970 GILBERT Y. CHIN ET AL 3,511,639

MAGNETIC ALLOY MATERIAL

Filed Sept. 5, 1967 2 Sheets-Sheet 2

United States Patent Office 3,511,639
Patented May 12, 1970

3,511,639

MAGNETIC ALLOY MATERIAL

Gilbert Y. Chin, New Providence, N.J., Donald Jaffe, Emmaus, Pa., and Ethan A. Nesbitt, Berkeley Heights, N.J., assignors to Bell Telephone Laboratories, Incorporated, Murray Hill and Berkeley Heights, N.J., a corporation of New York Filed Sept. 5, 1967, Ser. No. 665,340
Int. Cl. C22c *19/00*
U.S. Cl. 75—170 9 Claims

ABSTRACT OF THE DISCLOSURE

Alloys including from 75–95 weight percent cobalt, 0.5–17 weight percent gold, remainder iron, cold drawn so as to result in a minimum thickness reduction of 20 percent evidence low levels of magnetostriction.

Figure 1:
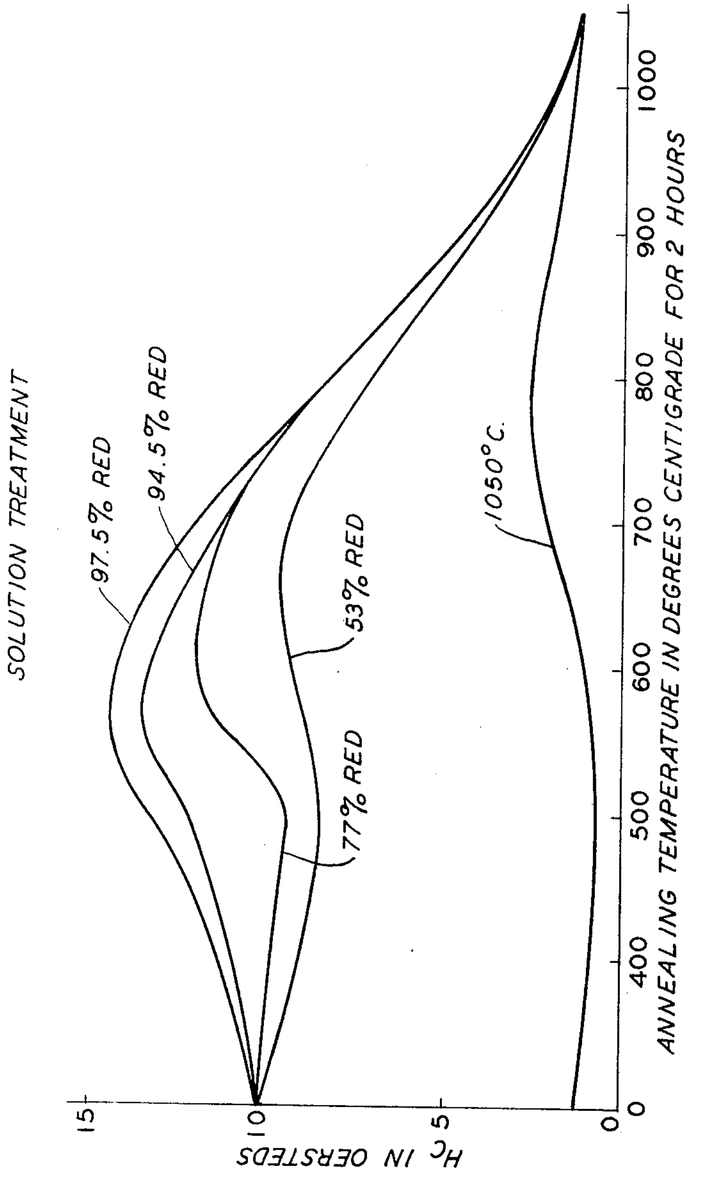

This invention relates to a technique for the preparation of magnetic alloy materials, to the materials themselves, and to devices containing such materials.

The materials of this invention are considered to be of particular interest in the fabrication of magnetic elements depending for their operation on remanent magnetization. This is a broad field of interest which encompasses magnetic switches and memory elements generally.

The design and fabrication of remanent magnetic elements is a sophisticated science having resulted in a large number of devices showing varying characteristics fulfilling varying needs. Such devices include the now common core memories which may take the form of a pierced sheet of U.S. Pat. 2,912,677, issued Nov. 10, 1959 to R. L. Ashenhurst et al., the twistor of U.S. Pat. 3,083,353, issued Mar. 26, 1963 to A. H. Bobeck, the laddic of U.S. Pat. 2,963,591, issued Dec. 6, 1960 to T. H. Crowley et al., as well as the various devices described in U.S. Pat. 2,736,880, issued May 11, 1956 to J. W. Forrester.

Most of these devices depend for their operation on the presence of remanence, that is, the ability of the material of which the memory element is constructed to remain magnetized after removal of an applied field. Interrogation of such an element involves reversing the direction of magnetization, often by the field produced by one or more associated current paths. Many element arrays utilize coincident current paths and so require the passage of "half currents" (each equal to one-half the current value required to produce a field necessary to overcome the coercivity of the material) in both paths simultaneously. Reading is accomplished by sensing the current induced in an associated winding by flux reversal with such current or currents.

Most magnetic memories and magnetic switches now in use are temporary in that the flux switching which occurs during the readout cycle for any segment magnetized during the write cycle leaves the element in its initial magnetic condition, that is, the condition representing no information storage. Such destructive memories are useful in many switching and memory applications. For example, in most parts of a computer, there is no need to store the problem after the circuit has yielded the answer. Similarly, in many switching applications, it is necessary only for the switching to perform its function once with no requirement of permanent storage.

There are, however, numerous situations calling for apparatus designs in which information once stored must be yielded repeatedly. This is true in many uses of the twistor in electronic switching where the storage elements serve to define a particular circuit path which is necessarily the flexible response to a given interrogation. At this time, this desideratum is often served by associating a plurality of small permanent magnets with the bit locations intended to yield induced current upon interrogation, the remanent magnetization of the permanent magnets being sufficient to overcome the coercivity of the softer magnetic material of which the element is constructed. In other circuitry, this may be accomplished by the use of a constant D-C bias through a current path. An example of the latter is the biased core access switch often associated with memory arrays.

More recently, effort has been directed toward the development of an electrically alterable permanent memory element operating on the piggyback principle. An example of this type of element is described in U.S. Pat. 3,067,408, issued to W. A. Barrett, Jr. on Dec. 4, 1962. Such devices depend for their operation upon the cooperation between magnetic materials of different remanence and coercivity in a manner such that the material with the larger value of remanence and coercivity (the harder material) influences the magnetization of the material of lower value of remanence and coercivity (the softer material) in a desired manner. In the operation of such a device, an information bit is stored at an address along the hard material by magnetizing the address bit in a direction as a representative of a binary "1" or "0" form. This is typically accomplished by the use of coincident currents. The more easily switched soft material, which is magnetically coupled to the hard material experiences a slave magnetization of opposite direction.

Readout of the stored information is accomplished by applying a magnetomotive force sufficient to switch the magnetization of the slave element but insufficient to effect the magnetization of the higher coercivity material. The readout magnetomotive force is such as to reverse the magnetization direction of all those slave bits that are coupled to the readout drive line. The electromotive force induced by those slave bits that change magnetization direction, say from "0," is the readout which describes the information stored in the high coercivity element. Once the readout operation is terminated by cessation of the applied readout force, the slave element will immediately be influenced by the magnetization of the stored information bit and its original direction of magnetization will be restored.

In order to perform in the manner described, the magnetic materials employed must have several specific properties. The "hard" memory bit in which the information is stored must have high coercivity in comparison to the slave material in order for it not to be affected by the magnetomotive force used to switch magnetization in the slave direction readout. Its remanence must be high so that once readout is terminated, there will be a magnetic field of sufficient value to influence the direction of magnetization in the slave material.

In addition, the permanent storage material of the slave material should exhibit square D-C hysteresis loops; that is, the ratio of the remanent magnetic induction to the saturation magnetic induction should approach unity. Square loop characteristics are important in order to approach a truly binary operation, where ideally the magnetic induction of a magnetic material switches between its positive and negative saturation values at a precise magnetic field intensity. Similarly, squareness obviates the need for currents to maintain the information throughout the storage life of the information bit since substantial diminution in the saturation magnetization will not occur.

The instant invention derives from the discovery that alloy materials within a defined compositional range, when processed in accordance with a specific schedule of conditions evidence a level of magnetostriction significantly lower than that evidenced by prior art materials commonly utilized in such applications. These materials have been found to evidence a square hysteresis loop with a high value of residual induction, a coercive force that can be varied up to 35 oersteds (the range of 10 to 20 oersteds being of interest for twistor applications) sufficient ductility to permit processing to a fine wire and tape, and a minimum change in magnetic properties with stress. The materials of this invention are alloys of the composition, 75–95 weight percent cobalt, 0.5–17 weight percent gold, remainder iron, to which standard additions may be made and in which certain unintentional inclusions may be tolerated. Above 95 percent cobalt, an undesirable hexagonal phase appears. Below 75 percent, the lower level of magnetostriction is lost with the concurrent formation of a body centered cubic lattice region. A preferred range of inclusion of this ingredient is from 80–85 weight percent, based upon the same considerations. Gold inclusion of at least the minimum indicated is required in order to retain control over the coercive force of the composition. A gold content of more than 17 percent poses a problem since it is difficult to get such quantities into solution. A preferred gold range is from 3–9 percent. An optimum composition has been found to be one containing 82 percent, by weight, cobalt, 6 percent, by weight, gold, remainder iron.

Other inclusions, intentional and unintentional, are known to those skilled in the art and are included or tolerated to certain limits for reasons which are understood. Thus, manganese may be present in an amount up to about 1 percent, by weight, based on the total composition, this inclusion is designed to bind any sulfur commonly present in commercial materials. Suitable alternatives are beryllium, magnesium, calcium, and so forth. Aluminum, frequently added to control oxygen, may be added in an amount of up to ¼ of 1 percent, by weight. Frequently encountered unintentional ingredients include nickel, often at a level of ½ of 1 percent, in certain commercial materials, tolerable up to a level of about 2 percent. Silicon may be present in an amount of about 2 percent, upon which workability is impaired. Similar considerations apply to molybdenum and tungsten, also tolerable up to about 2 percent, phosphorous and sulfur, only tolerable up to about 0.1 of 1 percent, and manganese to about 2 percent.

Necessary processing constitutes the final steps of cold working such as to result in a minimum thickness reduction of 20 percent, as calculated from the fraction $$\frac{t_1-t_2}{t_1}$$

where $t_1$ and $t_2$ are a dimension subject to reduction during working, before and after reduction. A heat treatment step may be desired for the purpose of generating specific properties or to satisfy device requirements and is carried out over the temperature range of from 100 to 1000° C. for the minimum time required to bring the body undergoing processing to such temperature for a period of at least one second. Typical heat treatment schedules are from one hour to 16 hours over the indicated temperature range, where a total thickness of ½ inch or greater is to be treated, and from one second to 60 seconds, where a single strand of material of thickness up to 0.025 inch is treated separately. Cold working may take any of the usual forms so long as the reduction as specified is accomplished. Forms of reduction found suitable include flat rolling in the form of sheet, swaging, grooved rolling, or drawing to produce either round, polygon or flat sections, and roll flattening round wire to produce tape.

The history of the material prior to the two steps set forth in the preceding paragraph is determined only by expediency. For example, where the initial body is of such dimensions that cold working to the final configuration is unfeasible, it may involve whatever sequence of hot and cold working steps may usefully be incorporated to yield a configuration of such dimensions as to be amenable to the necessary cold working.

Figure 2:
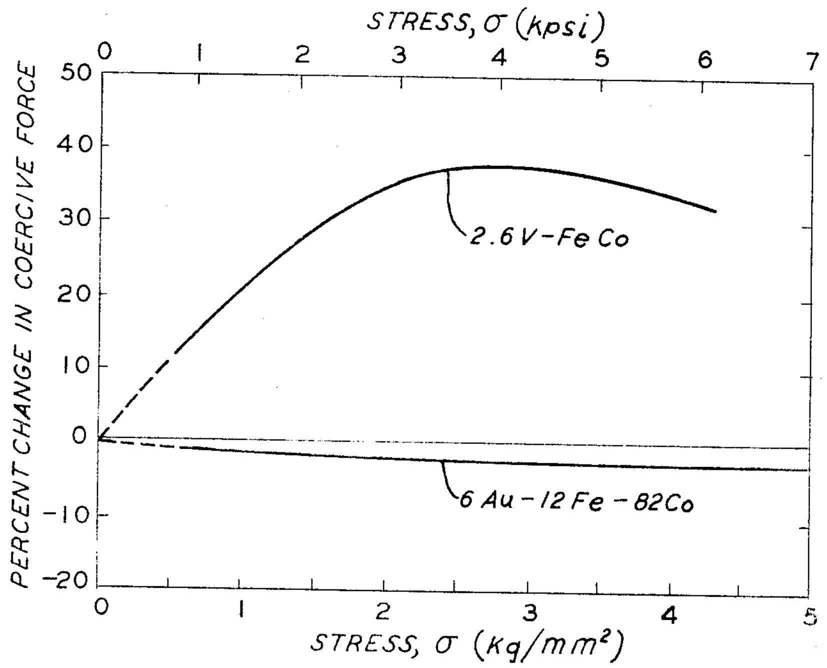
Figure 3:
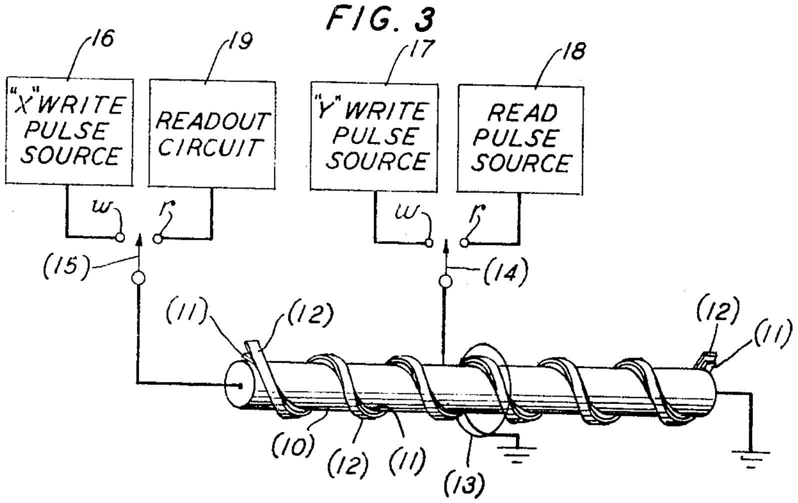

The invention will be more readily understood by reference to the following detailed description taken in conjunction with the accompanying drawing, wherein:

FIG. 1 on coordinates of coercivity $H_c$, in oersteds on the ordinate and annealing temperature in degrees centigrade on the abscissa is a graphical representation showing variations in the coercive force as a function of final heat treatment for materials which have undergone the requisite cold reduction;

FIG. 2 on coordinates of percent change in coercive force on the ordinate and stress in kilograms per square millimeter on the abscissa is a graphical representation showing a comparison of the change of coercive force between a material of the present invention and a conventional twistor material; and FIG. 3 is a view of a magnetic memory device utilizing an element constructed of a material of this invention.

Detailed description of FIGS. 1 and 2 is in terms of the following examples describing processing conditions which resulted in the material upon which the curves were based.

EXAMPLE I 743.88 grams of cobalt, representing 82 weight percent of the final composition, and 108.86 grams of iron, representing 12 weights percent of the final composition were placed in an alumina crucible, approximately 4 inches in height having an inner diameter of 2½ inches and having a hole in the bottom thereof which was sealed with an alumina stopper rod. 54.43 grams of gold, representing 6 weight percent of the final composition were placed in a separate cup to be added at a later stage in the processing. The alumina crucible was placed in a vacuum induction furnace which was evacuated and pumped down to approximately $10^{-4}$ torr. Next, the cobalt-iron charge was melted at a temperature of approximately 1600° C. Following, the temperature of the system was reduced to approximately 1525° C., the gold added and the temperature increased to approximately 1550° C. and held thereat for five minutes. The resultant melt was then bottom poured into a water cooled copper mold to yield an as-cast ingot approximately 16 inches in length by ¾ of an inch in diameter, weighing approximately 2 pounds. The ingot was machined to ⅝ inch in diameter and heated to a temperature of 925° C. for two hours in a hydrogen ambient. Following, the ingot was swaged with reheating between steps, as required, at 925° C. in hydrogen until a diameter of 0.107 inch was attained. At that point, the resultant wire was annealed at 925° C. in hydrogen for one hour and then cold-drawn further to various smaller diameters.

A series of wire specimens were prepared in the foregoing manner representing five different levels of reduction of area (0 percent, 53 percent, 77 percent, 94.5 percent and 97.5 percent, as defined by the equation $$RA=1-\left(\frac{t_2}{t_1}\right)^2$$

wherein $t_2$ and $t_1$ are as previously defined) prior to final aging treatment. The wire representing 0 percent reduction-in-area was given a solution treatment for two hours at 1050° C. which resulted in complete recrystallization of the material. Individual specimens were then cut from each of the wires and given a final two hour heat treatment at a temperature within the range of 400°–1000° C.

FIG. 1 is a graphical representation on coordinates of coercive force against final heat treatment temperature for specimens representing each of the levels of cold work. It is to be noted that the specimens which had been solution treated at 1050° C. (0 percent reduction in area) exhibited a small coercive force peak at 775°

C., this peak force being less than 3 oersteds. As the amount of prior cold work increases, the peak coercive force increases and the temperature of the peak shifts downward. Thus, the specimen having a prior reduction-in-area of 97.5 percent evidenced a peak coercive force of approximately 14.3 oersteds at 500° C. Accordingly, it is evident that cold working prior to the aging treatment greatly enhances the coercive force and lowers the temperature for obtaining maximum coercive force. As is known to those skilled in the art, higher temperatures may be used to accomplish similar results in a shorter period of time.

EXAMPLE II

The procedure of Example I was repeated to the annealed .107 inch diameter wire stage. The wire was then cold drawn to a diameter of .025 inch. At that point the wire was strand annealed in nitrogen at a rate of 24 feet per minute in a furnace having a six foot long heat zone. The annealed wire was then further drawn to a diameter of approximately 2 mils and roll flattened to a tape approximately .0005 inch thick. The tape was given a final strand anneal for two seconds at 850° C. An evaluation of the stress sensitivity of the coercive force of the resultant tape was carried out using a 60 cycle loop tracer and an applied field of 50 oersteds. The values of coercive force with various applied tensile stresses ($\sigma$) were then determined and plotted in FIG. 2 as percent change in coercive force, $$[Hc(\sigma)-Hc(\sigma=0)/Hc(\sigma=0)]\times 100$$

against stress. As noted in FIG. 2, the data reveal a small negative change which is approximately linear with increasing stress. The change in coercive force is 3.3 percent at an applied tension of 4.9 kilograms per square millimeter, indicating a low of magnetostriction.

For comparative purposes, stress sensitivity measurements were conducted with an alloy of 2.6 percent vanadium containing equal amounts of iron and cobalt, a prior art composition employed in the piggyback twistor. The high stress sensitivity of the coercive force of this alloy can be noted with a change in coercive force of approximately 39 percent at a stress of 2.5 kilograms per square millimeter, such alloy having a high magnetostrictive value.

The device of FIG. 3 is a memory element known as a piggyback twistor. Shown in the figure is a conductor 10 about which there is disposed a first helical winding 12 of a different magnetic material. The material of winding 12 may be a composition processed in accordance with the invention. For purposes of describing the illustrative memory element shown in FIG. 3, a single information address will be assumed to be defined thereon.

Defining an information address on conductor 10 and its magnetic components 11 and 12, is a coupled winding 13, one end of which, as one end of the conductor 10, is connected to ground. The other ends of the winding 13, one end of which, as one end of the conductor 10, a pair of ganged wipers 14 and 15 of a two-position switch having a pair of *w* and a pair of *r* contacts. "*x*" and "*y*" write curent pulse sources 16 and 17 are connected to the *w* contacts contacted by the wipers 15 and 14 respectively. A read current pulse source 18 is connected to the *r* contact contacted by the wiper 14 and an information utilization circuit 19 is connected to the *r* contact contacted by the wiper 15. Common conductor 10 is connected to an input circuit and an output circuit during the respective write and read phases of operation.

The introduction of an information bit in the information address of conductor 10 is accomplished as follows:

With the wipers 15 and 14 in the *w* position, coincident write currents from the "*x*" and "*y*" sources 16 and 17 respectively, induce a primary magnetization in the helical component 12 at the information address. The field of the primary magnetization induces a slave magnetization in component 11 which latter magnetization may be sensed by an applied return field. The latter field is generated with the wipers 14 and 15 at the *r* positions when a read current pulse is applied from source 18. The output signal voltage representative of the stored information value will be generated in common conductor 10 and then transmitted to the utilization circuit 19 via the wiper 15. When the read current pulse is terminated, the field of the primary magnetization again restores the slave magnetization to its normal polarity without the application of accessory circuitry or external power expenditure.

What is claimed is:

1. Composition of matter consisting essentially of 75–95 weight percent cobalt, 0.5–17 weight percent gold, remainder iron.

2. Composition in accordance with claim 1 wherein cobalt is present in an amount within the range of 80–85 weight percent.

3. Composition in accordance with claim 1 wherein gold is present in an amount within the range of 3–9 weight percent.

4. Composition in accordance with claim 1 having 82 weight percent cobalt, 6 weight percent gold, remainder iron.

5. Ferromagnetic body comprising an alloy consisting essentially of 75–95 weight percent cobalt, .5–17 weight percent gold, remainder iron, produced by cold working to result in a thickness reduction of at least 20 percent as determined from the fraction $$\frac{t_1-t_2}{t_1}$$

wherein $t_1$ and $t_2$ are a dimension subject to reduction by working.

6. Ferromagnetic body in accordance with claim 5 wherein said alloy is partially annealed at a temperature in the range of 100–1000° C. for a period of at least one second.

7. Ferromagnetic body of claim 6 wherein the cobalt content is from 80–85 weight percent and the gold content is from 3–9 weight percent.

8. Ferromagnetic body of claim 6 wherein the cobalt content is 82 percent by weight and the gold content is 6 percent by weight.

9. Ferromagnetic body of claim 6 wherein the cobalt content is from 75–85 weight percent and the gold content is from 0.5–9 weight percent.

References Cited

UNITED STATES PATENTS

| | | | |
|---|---|---|---|
| 3,067,029 | 12/1962 | Gyorgy et al. | 75—170 |
| 3,444,012 | 5/1969 | Shimizu et al. | 148—31.57 |

RICHARD O. DEAN, Primary Examiner

U.S. Cl. X.R.

148—31.55, 31.57, 100, 120, 121